April 15, 1924.

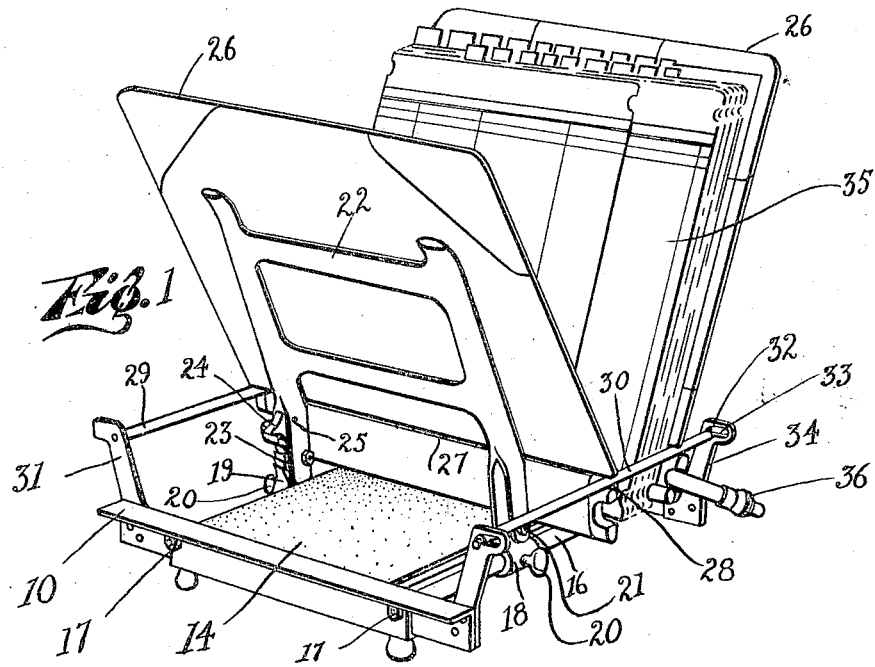

C. R. HADLEY

POSTING STAND

Filed Sept. 25, 1922   2 Sheets-Sheet 2

1,490,465

INVENTOR.
Charles R. Hadley
BY Lyon & Lyon
ATTORNEYS.

Patented Apr. 15, 1924.

1,490,465

UNITED STATES PATENT OFFICE.

CHARLES R. HADLEY, OF LOS ANGELES, CALIFORNIA.

POSTING STAND.

Application filed September 25, 1922. Serial No. 590,227.

*To all whom it may concern:*

Be it known that I, CHARLES R. HADLEY, a citizen of the United States, residing at Los Angeles, in the county of Los Angeles and State of California, have invented a new and useful Posting Stand, of which the following is a specification.

This invention relates to posting stands of the type employed in machine book-keeping and is especially useful in random posting.

An object of this invention is to provide a posting stand of this type in which the binder covers are interlocked with the stand when the binder is in posting position.

Another object is to facilitate the various operations incident to the use of the stand during the posting of accounts.

Another object is to make provision for preventing the binder leaves from sliding along their supporting member, when the covers of the binder are unlocked.

The accompanying drawings illustrate the invention:

Figure 1 is a perspective view of a posting stand embodying the invention, a looseleaf binder being shown in posting position interlocked with the stand.

Fig. 2 is a plan view of the stand shown in Figure 1.

Figure 3:
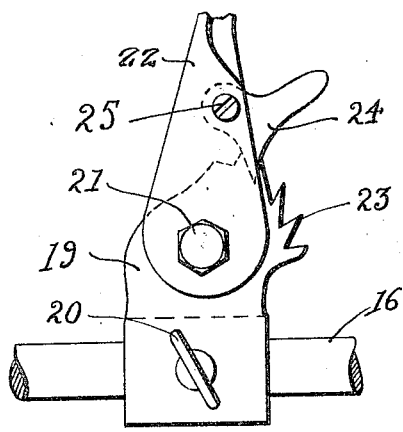
Fig. 3 is an enlarged side elevation of one of the angle adjusting devices for the cover rests, the slide on which the toothed sector is mounted, and a fragment of one of the guides.
Figure 4:
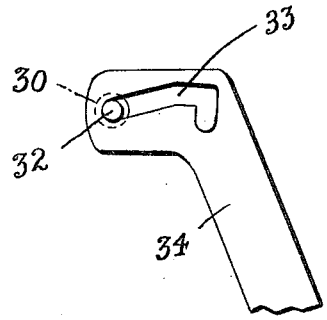
Fig. 4 is an enlarged fragmental detail of one of the supports for the movable guide, said guide also being shown.
Figure 5:
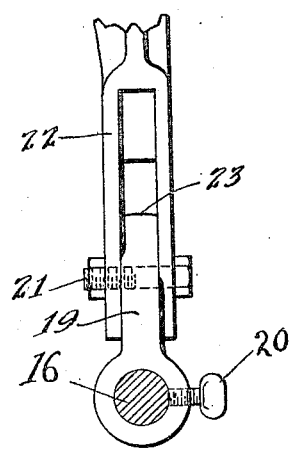
Fig. 5 is an elevation from the left of Figure 3 omitting the detent.
Figure 6:
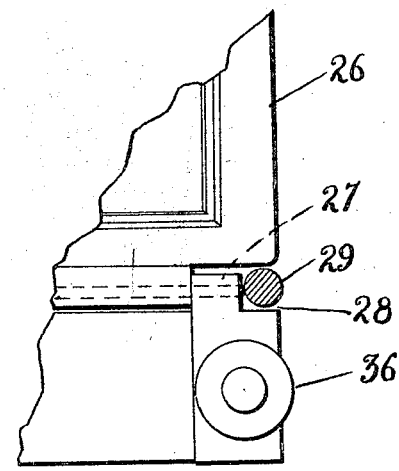
Fig. 6 is a fragmental elevation of one corner of one of the binder covers, showing it interlocked with one of the guides, which is in section.
Figure 7:
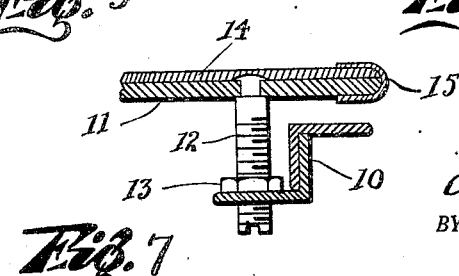
Fig. 7 is an enlarged sectional detail on the line indicated by 7—7, Fig. 2.

There is provided a suitable base comprising flanged end members 10 and a leaf-supporting member or plate 11 adjustably mounted on the members 10. In this instance, the member 11 is supported on screws 12 which pass through the member 11 and are headed over on the upper face of said member so as to prevent separation of the screws and said member and permit turning of the screws. The screws 12 are threaded through the lower flanges of each of the member 10 so that there will be a screw adjacent each corner of the member 11. The screws may be provided with lock nuts 13 adapted to be tightened against the upper faces of the lower flanges of the members 10 to lock the screws in their adjusted positions.

Preferably the member 11 is provided on its upper face with a friction pad 14, of rubber or other suitable material, channeled clips 15 binding the ends of the pad 14 to the member 11. The purpose of this pad will be mentioned hereinafter.

Adjacent the longitudinal edges of the member 11 and parallel therewith are rods 16 which project through the members 10 and are held against endwise movement by nuts 17. Mounted on the rods 16 are slides 18, 19 which are adjustably held against movement along the rods by screws 20 threaded through the slides and engaging said rods. Pivotally connected at 21 to each pair of the slides 18, 19 is a cover rest 22.

The slides 19 are provided with toothed sectors 23 engaged by detents 24 which are pivoted at 25 to the rests 22. The sectors 23 and detents 24 enable the operator to adjust the rests 22 to different angles with relation to the base, so that the binder covers, shown at 26, will be held aslant upwardly away from one another as in Figure 1.

In the particular instance shown, each of the covers 26 comprises two hingedly connected sections, the hinge being indicated at 27. Binders of this character are well known in the art pertaining to binders and it is, therefore, unnecessary to describe in detail how said covers are constructed. One of the sections of each cover is notched at its ends at 28, adjacent the other section of the cover, so as to accommodate guides 29, 30 which are mounted on opposite sides of the base above the level of the member 11 and parallel therewith. The guide 29 is stationarily mounted, having its ends supported by standards 31 which are connected with the members 10. The guide 30 is mounted so that it can be moved toward and from the binder and for this reason it has its opposite ends reduced in diameter at 32 and the reduced ends engage slots 33 in standards 34 which are secured to the members 10. The slots 33 are angular, the upright legs of the slots being adjacent the inner edges of the standards so that, when the guides 29, 30 are interlocked with the binder notches 28, the guide 30 engages the upright legs of the slots to hold the guide 30 against movement away from the binder.

The lower edges of the upper binder sections rest upon the guides 29, 30. Thus said upper cover sections are supported and can be shifted to any suitable position along the guides without the lower cover sections collapsing and interfering with the leaves 35 of the binder. The distance from the level of the upper faces of the guides 29, 30 to the upper face of the pad 14 should be slightly greater than the length of the lower cover sections so that said lower cover sections will be free from engagement with the pad 14 and freely suspended from the pad 14 in order that the upper cover sections will lie flat against the rests 22. The means for locking the binder closed are indicated at 36, and said means will not be described in detail herein as they are well understood in the art pertaining to binders, and they may be of any desired construction in so far as the functioning of this invention is concerned.

In practice, the binder covers being in closed position and it being desired to place the binder on the stand, the guide 30 will be raised and then moved outwardly in the slots 33 away from the binder, and the binder will be placed on the pad 14 with the notches 28 adjacent the guides 29, 30. The binder will then be moved edgewise to engage the guide 29 with the adjacent cover notches, and the guide 30 will then be moved into engagement with the cover notches adjacent it. Then the locking device 36 will be released and the covers placed approximately as shown in Figure 1, the rests 22 supporting the covers in slanting positions so that access may be readily had to any of the leaves 35. The slant of the covers 26 may be readily adjusted by causing the detents 24 to engage other teeth of the toothed sectors 23. As soon as the leaves 35 have been released, by opening the locking means 36, the lower edges of said leaves will rest upon the friction pad 14 which functions to support them without permitting the leaves to slide and bend as they would do if frictional means were not provided. If the cover rests 22 are spaced too closely or insufficiently, the screws 20 will be loosened and the slides 18, 19 adjusted along the rods 16 until the position of the rests suits the operator.

If the covers bear upon the pad 14, the screws 12 will be adjusted to lower the support 13 until said covers are free from engagement with the pad.

The posting operations will then be performed in a manner well understood in accountancy and, if desired, the leaves that have been posted may be offset so as to engage the guide 30. The guide 30 then aligns the offset leaves the same as the guide 29 aligns those leaves that are not offset. After the posting operations are completed, the binder may be closed and detached from the stand by a reversal of the foregoing described operations, so that the offset arrangement of the leaves can be retained as long as desired.

It will be readily understood from the foregoing that by the construction described above the binder is securely interlocked with the stand when the guide 30 is closed, making it impossible to accidentally knock the binder covers and leaves off of the stand. Correct posting and locking positions of the binder covers are assured because said covers can be slid along the guides into the different positions. This posting stand, though having a flat leaf support, will securely hold the holeless form of ledger leaf generally termed, in this art, tumble form.

I claim:

1. In a posting stand, the combination of a base, rods mounted on the base, slides adjustable along the rods, cover rests hinged to the slides, and means to hold the cover rests at different angles relative to the base.

2. In a posting stand, the combination of a base, cover rests mounted on the base, standards mounted on the base, and guides supported by the standards, the standards for one of the guides having angular slots to receive said guide and the last named guide adapted to engage notches in the covers of a binder when said guide engages the lowest portions of the angular slots.

3. In a posting stand, the combination of a base comprising an adjustable leaf support, and means to support the covers of a binder free from engagement with said leaf support.

Signed at Los Angeles, California, this 11th day of September, 1922.

CHARLES R. HADLEY.